3,694,365
COMPOSITIONS FOR CLEANING AND STERILIZING MILK EQUIPMENT

Charles S. Castner, Reading, Pa., assignor to
Schuyler Development Corporation
No Drawing. Filed Dec. 21, 1970, Ser. No. 100,537
Int. Cl. C11d 3/04, 3/48
U.S. Cl. 252—106     4 Claims

ABSTRACT OF THE DISCLOSURE

A composition is provided for cleaning and sterilizing milk equipment and the like. The composition is a concentrate for dilution in water and consists of:

| | Percent |
|---|---|
| Isopropanol | 20–30 |
| Hexylene glycol | 10–15 |
| Ethylene glycol monomethyl ether | 5–10 |
| Amonium chloride | 2–5 |
| Disodium tetraborate | 3–7 |
| Isooctylphenoxy polyethoxyethanol | 2–7 |
| Diethylene glycol monoethyl ether | 1–4 |
| Alkali metal hydroxide | 1–2 |
| Ammonia | 2–5 |
| $C_9$–$C_{15}$ alkyl tolylmethyl trimethyl ammonium chloride | 11–22 |
| Eethylene diamine tetra acetate | 0.25–1 |
| Water | Balance |

This invention relates to methods and compositions for cleaning and sterilizing milk equipment and particularly to a quaternary ammonium cleaning and sterilizing composition and a method of cleaning which is based on its use.

The cleaning and sterilizing of milk handling equipment is a difficult problem because the milk solids tend to react with many sterilizing compounds to destroy their effectiveness and in many cases they tend to deposit on the equipment leaving a film which is extremely difficult to remove. This problem is accentuated where milk solids have been permitted to solidify and dry on the equipment.

Among the most satisfactory cleaning and sterilizing materials for most purposes are the quaternary ammonium compounds. Unfortunately these materials are quickly destroyed by milk solids and they have not been usable in cleaning and sterilizing milk equipment for this reason.

I have invented a composition using quaternary ammonium compounds which may be used for cleaning and sterilizing milk equipment without losing the effectiveness of the quaternary ammonium compound.

I provide a composition having broadly the following composition:

| | Percent |
|---|---|
| Isopropanol | 20–30 |
| Hexylene glycol | 10–15 |
| Ethylene glycol mono methyl ether (methyl Cellosolve) | 5–10 |
| Amonium chloride | 2–5 |
| Disodium tetra-borate | 3–7 |
| Surfactant (isooctylphenoxy polyethoxy ethanol) | 2–7 |
| Diethylene glycol monoethyl ether (carbitol) | 1–4 |
| Alkali metal hydroxide | 1–2 |
| Ammonia | 2–5 |
| Quaternary ammonium compound (X–2500 Hyamine) | 11–22 |
| Ethylene diamine tetra acetate | 0.25–1 |
| Water | Balance |

A typical preferred composition would be

| | Percent |
|---|---|
| Isopropanol | 25 |
| Hexylene glycol | 12 |
| Methyl Cellosolve | 8 |
| Ammonium chloride | 3 |
| Disodium tetra borate | 5 |
| Surfactant | 4 |
| Carbitol | 2 |
| Sodium hydroxide | 1 |
| Ammonia | 3 |
| Quaternary ammonium compound | 16 |
| Ethylene diamine tetraacetate | 0.5 |
| Water | Balance |

The composition of this invention is mixed with hot water 150° to 165° F. at the rate of one to three ounces per gallon and pumped through the milk equipment to cleanse it. This is preferably followed by clear hot water (165° F.) to rinse.

An alternate practice is a "two shot" process in which the foregoing composition without quaternary ammonium compounds is first pumped through the milking system followed by the foregoing composition containing quaternary ammonium compounds. This is finally followed by a clear water rinse.

The practice of this invention provides significant time and money savings over the currently used cleaners. At present the materials now being used are combination chlorinated bulk cleaners, acid/and/or chlorine phosphate types of cleansers. These prior art materials take approximately 45 minutes whereas the composition of this invention requires only a two minute wash cycle followed by a five minute hot water rinse. The material of my invention is about ⅓ the cost of these prior art materials.

The practice of the invention can perhaps be best illustrated by the following example. An all glass milking pipeline which had been cleaned after previous milkings by means of a chlorinate bulk cleaner using a 45 minute wash (three cycles of 15 minutes each). The lines showed a slight film after each cleaning. Milking was carried out as usual and the lines were then washed with a solution of two ounces of the preferred formulation using as the quaternary ammonium compound Rohm & Haas Hyamine (alkyl tolylmethyl trimethyl ammonium chloride) set out above per gallon of hot (150° F.) water for a cycle of 5 minutes. This was followed by a clear hot water (165° F.) rinse cycle for 5 minutes. At the end of the rinse cycle the pipeline was clear of all film; there were no traces of deposited milk solids, no traces of deposited quaternary ammonium compounds and the film from previous treatments was gone.

In the practice of my invention I preferably use as the quaternary ammonium compound one of Rohm & Haas Hyamines which are alkyl ($C_9$ to $C_{15}$) tolymethyl trimethyl ammonium chlorides sometimes also described as methyl dodecyl benzyl trimethyl ammonium chloride. These materials are excellent bactericides as well as cleansing agents.

White I have described certain preferred practices and compositions of my invention in the foregoing specification, it will be understood that this invention may be otherwise embodied within the scope of the following claims.

I claim:

1. A composition for extension in aqueous solution for cleaning and sterilizing milk equipment and the like comprising:

| | Percent |
|---|---|
| Isopropanol | 20–30 |
| Hexylene glycol | 10–15 |
| Ethylene glycol monomethyl ether | 5–10 |
| Ammonium chloride | 2–5 |
| Disodium tetraborate | 3–7 |
| Isooctylphenoxy polyethoxyethanol (Surfactant) | 2–7 |
| Diethylene glycol monoethyl ether | 1–4 |
| Alkali metal hydroxide | 1–2 |
| Ammonia | 2–5 |
| $C_9$–$C_{15}$ alkyl tolylmethyl trimethyl ammonium chloride (quaternary ammonium compound) | 11–22 |
| Ethylene diamine tetracetate | 0.25–1 |
| Water | Balance |

2. A composition as claimed in claim 1 having the composition:

| | Percent |
|---|---|
| Isopropanol | 25 |
| Hexylene glycol | 12 |
| Eethylene glycol monomethyl ether | 8 |
| Ammonium chloride | 3 |
| Disodium tetraborate | 5 |
| Isooctylphenoxy polyethoxyethanol | 4 |
| Sodium hydroxide | 1 |
| Diethylene glycol monoethyl ether | 2 |
| Ammonia | 3 |
| $C_9$–$C_{15}$ alkyl tolylmethyl trimethyl ammonium chloride | 16 |
| Ethylene diamine tetraacetate | 0.5 |
| Water | Balance |

3. A composition as claimed in claim 1 wherein the alkali metal hydroxide is sodium hydroxide.

4. A composition as claimed in claim 1 wherein the alkali metal hydroxide is potassium hydroxide.

References Cited

UNITED STATES PATENTS

| | | | |
|---|---|---|---|
| 2,541,248 | 2/1951 | Hibbs | 252—106 X |
| 2,599,127 | 6/1952 | Resuggan | 252—106 |
| 3,223,644 | 12/1965 | Law | 252—106 |
| 3,247,119 | 4/1966 | Herrick et al. | 252—106 |
| 3,394,174 | 7/1968 | Feigin | 252—106 X |

RICHARD D. LOVERING, Primary Examiner

U.S. Cl. X.R.

134—22 R; 252—527, 528, DIG. 1, DIG. 11, DIG. 14; 424—329